US009121378B2

(12) United States Patent
Katzenberger et al.

(10) Patent No.: US 9,121,378 B2
(45) Date of Patent: Sep. 1, 2015

(54) METHOD FOR DETERMINING THE FORCE CONDITIONS AT THE NOZZLE NEEDLE OF A DIRECTLY DRIVEN PIEZO INJECTOR

(75) Inventors: Michael Katzenberger, Regensburg (DE); Robert Hoffmann, Ruhstorf/Rott (DE); Simon Ruscheinski, Rain (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 38 days.

(21) Appl. No.: 14/006,955

(22) PCT Filed: Mar. 8, 2012

(86) PCT No.: PCT/EP2012/053960

§ 371 (c)(1), (2), (4) Date: Sep. 23, 2013

(87) PCT Pub. No.: WO2012/126736

PCT Pub. Date: Sep. 27, 2012

(65) Prior Publication Data

US 2014/0007665 A1 Jan. 9, 2014

(30) Foreign Application Priority Data

Mar. 23, 2011 (DE) ......................... 10 2011 005 934

(51) Int. Cl.

*G01L 5/00* (2006.01)
*F02M 65/00* (2006.01)
*F02D 41/20* (2006.01)

(52) U.S. Cl.

CPC ......... *F02M 65/001* (2013.01); *F02D 41/2096* (2013.01); *F02D 2041/2051* (2013.01); *F02D 2200/063* (2013.01)

(58) Field of Classification Search

CPC .................. F02D 2041/2055; F02M 51/0607; G01B 3/008
USPC ...................................... 73/760, 777, 862.01
See application file for complete search history.

(56) References Cited

U.S. PATENT DOCUMENTS 7,505,846 B2 3/2009 Stoecklein et al. ........... 701/105
7,617,813 B2 11/2009 Pirkl et al. .................... 123/490

(Continued)

FOREIGN PATENT DOCUMENTS

DE 102004058971 A1 6/2006 .............. F02D 41/20
DE 102004062073 A1 7/2006 .............. F02D 41/20

(Continued)

OTHER PUBLICATIONS

International Search Report and Written Opinion, Application No. PCT/EP2012/053960, 12 pages, Jul. 17, 2012.

*Primary Examiner* — Max Noori
(74) *Attorney, Agent, or Firm* — Slayden Grubert Beard PLLC

(57) ABSTRACT

A method is disclosed for determining the force acting on the nozzle needle of a directly driven piezo injector, in which an electrical voltage is built on the piezo actuator which drives the nozzle needle by means of a charging process. After the charging process has ended, the voltage at the piezo actuator is measured again. A voltage gradient is determined from consecutive voltage values. Conclusions of the force acting on the nozzle needle are drawn from the voltage gradients.

14 Claims, 3 Drawing Sheets

(56) References Cited

U.S. PATENT DOCUMENTS

| | | | | |
|---|---|---|---|---|
| 7,685,733 | B2 * | 3/2010 | Ohmori et al. | 33/559 |
| 7,828,228 | B2 * | 11/2010 | Mochizuki et al. | 239/102.2 |
| 8,239,115 | B2 | 8/2012 | Ascher et al. | 701/103 |
| 8,308,266 | B2 * | 11/2012 | Numata et al. | 347/19 |
| 8,365,704 | B2 | 2/2013 | Beilharz et al. | 123/480 |
| 8,631,785 | B2 * | 1/2014 | Marzahn et al. | 123/478 |
| 8,714,140 | B2 * | 5/2014 | Borchsenius et al. | 123/494 |
| 8,753,495 | B2 * | 6/2014 | Buschnakowski et al. | 204/433 |

FOREIGN PATENT DOCUMENTS

| | | | | |
|---|---|---|---|---|
| DE | 102005002242 | A1 | 7/2006 | F02D 41/20 |
| DE | 102007038985 | A1 | 2/2009 | F02D 41/20 |
| DE | 102007061946 | A1 | 6/2009 | F02D 41/20 |
| EP | 1138909 | A1 | 10/2001 | F02D 41/20 |
| WO | 2009/010374 | A1 | 1/2009 | F02D 41/20 |
| WO | 2012/126736 | A1 | 9/2012 | F02D 41/20 |

* cited by examiner

METHOD FOR DETERMINING THE FORCE CONDITIONS AT THE NOZZLE NEEDLE OF A DIRECTLY DRIVEN PIEZO INJECTOR

CROSS-REFERENCE TO RELATED APPLICATIONS

This application is a U.S. National Stage Application of International Application No. PCT/EP2012/053960 filed Mar. 8, 2012, which designates the United States of America, and claims priority to DE Application No. 10 2011 005 934.2 filed Mar. 23, 2011, the contents of which are hereby incorporated by reference in their entirety.

TECHNICAL FIELD

This disclosure concerns a method for determining the force conditions at the nozzle needle of a directly driven piezo injector.

BACKGROUND

Fuel injection systems of the latest generation usually work on the common rail principle and often contain injectors driven piezo-electrically. Here one or more such piezo injectors, which can be opened and closed in a targeted manner, are provided at each combustion chamber of the internal combustion engine. When the injectors are open, fuel enters the interior of the combustion chamber and combusts there. To ensure good combustion and exhaust emissions, and for comfort reasons, the injected fuel quantity should be determined as precisely as possible.

WO 2009/010374 A1 discloses a method and a device for forming an electrical control signal for an injection pulse of a fuel injector. This electrical control signal activates a piezo-electric actuator to inject a predefined fuel quantity into a cylinder of an internal combustion engine. Using the curve of the electrical control signal, an injection rate of the fuel injector is regulated as a function in particular of the rail pressure, the stroke travel and/or the opening duration of the fuel injector. For at least a partial fuel quantity to be injected, the curve of the electrical control signal can be freely formed in relation to at least one pulse flank and/or amplitude. The form of the injection pulse is structured such that the predefined fuel quantity for injection is held constant irrespective of the curve of the electrical control signal.

When forming the rate curve for the fuel, it is important to maintain the injection quantities required by the internal combustion engine for mixture formation within tight tolerances in order to influence the emissions and fuel consumption of the respective motor vehicle in the desired manner.

One essential aspect in the forming of the rate curve is the so-called part-stroke operation. Here the nozzle needle is held in a middle position between the nozzle seat (injector closed) and the end stroke position (injector opened to the maximum) of the nozzle needle in order to influence the fuel flow through the nozzle and hence the mixture formation.

In practice there is a problem in setting and achieving the said part stroke precisely, in that the injection quantity required by the internal combustion engine can be guaranteed as an integral of the fuel flow through the nozzle, which is dependent on the injection nozzle needle stroke. This problem arises because in part-stroke operation, component tolerances of the injector under different ambient conditions (pressure, temperature) in operation of the injector in an internal combustion engine, because of the steepness of the flow curve of the nozzle, over the needle stroke, have a tendentially greater effect than is the case in full-stroke operation of the injector.

In internal combustion engines, the benefits of forming the rate curve and its influence on emissions have been primarily studied on internal combustion engines in which the cylinder pressure, various temperatures and sometimes also the needle stroke are monitored by means of external sensors. Use of such sensors is costly and is not therefore applied in motor vehicles for cost reasons.

SUMMARY

One embodiment provides a method for determining a force acting on the nozzle needle of a directly driven piezo injector, wherein by means of a charging process an electrical voltage is built up at the piezo actuator which drives the nozzle needle, wherein at the end of the charging process, the voltage present at the piezo actuator is measured again, a voltage gradient is determined from consecutive voltage values, and conclusions about the force acting on the nozzle needle can be drawn from the voltage gradients.

In a further embodiment, using the voltage gradient determined, a database is addressed in which a force value is allocated to each of a plurality of voltage gradients.

In a further embodiment, conclusions about the stroke of the nozzle needle can be drawn from the force value determined.

In a further embodiment, using the force value determined, a database is addressed in which a stroke value is allocated to each of a plurality of force values.

In a further embodiment, conclusions about the fuel flow can be drawn from the nozzle needle stroke.

In a further embodiment, using the stroke value determined, a database is addressed in which a fuel flow value is allocated to each of a plurality of stroke values.

In a further embodiment, conclusions about the fuel quantity injected can be drawn from the fuel flow value.

In a further embodiment, the conclusions about the fuel quantity injected can be drawn by forming an integral of the fuel flow value.

BRIEF DESCRIPTION OF THE DRAWINGS

Example embodiments are discussed below with reference to the figures, in which.

DETAILED DESCRIPTION

Embodiment of the present invention provide a method for determining the force acting on the nozzle needle of a directly driven piezo injector.

According to one embodiment, a method is provided for determining the force acting on the nozzle needle of a directly driven piezo injector, wherein during the opening process and in a part-stroke operation, by means of a charging process an electrical voltage is built up at the piezo actuator which drives the nozzle needle, and wherein after the end of the charging process, the voltage present at the piezo actuator is measured again, a voltage gradient is determined from consecutive voltage values, and conclusions about the force acting on the nozzle needle can be drawn from the voltage gradients.

The information determined about the force acting on the nozzle needle can advantageously be used to draw conclusions about the stroke of the nozzle needle. Knowledge of the stroke of the nozzle needle in turn allows the fuel flow through the piezo injector to be determined. Finally the fuel quantity injected can be determined from the fuel flow by integral formation. This in turn allows a precise setting of a part-stroke operation, in order at the end of the work cycle, to guarantee the injection quantity required by the internal combustion engine as an integral of the fuel flow through the nozzle, which is dependent on the injection nozzle needle stroke, although in this operating mode the component tolerances in the injector and different ambient conditions in operation of the injector in the internal combustion engine, because of the steepness of the flow curve of the nozzle, over the needle stroke, have a tendentially greater effect than in a full-stroke operation.

Figure 1:
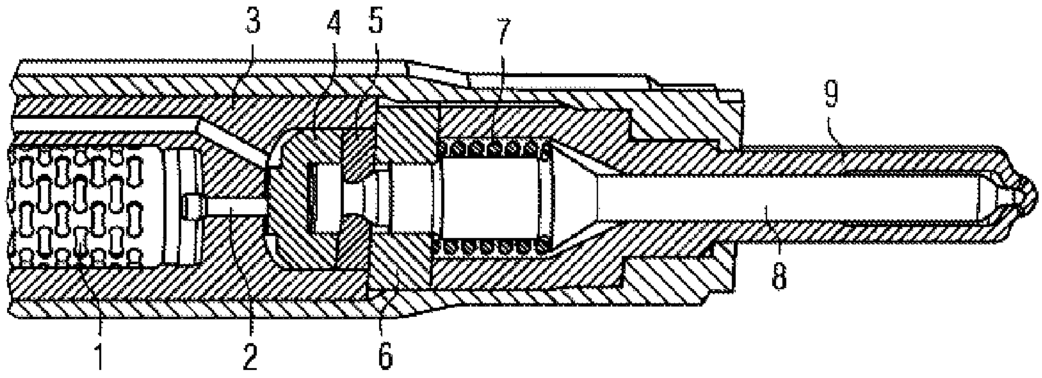
FIG. 1 is a sketch to explain the structure of a piezo injector in which a method according to certain embodiments can be used.

FIG. 1 shows a sketch to explain the structure of a piezo injector in which a method according to certain embodiments can be used. The piezo injector shown has a piezo actuator 1, a pin 2, a lever housing 3, a bell 4, a lever 5, an intermediate disc 6, a nozzle needle spring 7, a nozzle needle 8 and a nozzle body 9.

The piezo actuator 1 includes a plurality of individual thin layers which expand on application of an electrical voltage, i.e. they translate an applied electrical voltage into mechanical work or energy. Conversely, mechanical influences on the piezo actuator provoke electrical signals which can be measured. The achievable expansion of a piezo actuator is dependent on parameters which include its nominal length, the number of layers, the quality of polarization achieved and the ratio of its active area to its total area. When a piezo actuator is charged, it remains in its achieved expansion for the duration of the injection concerned.

The exemplary embodiment shown in FIG. 1 depicts a piezo injector in which the nozzle needle 8 is driven directly by the piezo actuator 1. To this end the piezo actuator 1 is connected directly to the nozzle needle 8 via the pin 2, the bell 4 and the needle 5, which are rigid coupling elements connected by form fit. This direct connection of the nozzle needle to the piezo actuator allows a back force to be applied by the needle movement to the piezo actuator, which is evident in the capacitance curve. Each application of force to the piezo actuator is expressed in a change in measured capacitance.

The nozzle body 9 expands temperature-dependently. The purpose of the nozzle needle spring 7 is to hold the nozzle needle 8 in its seat. Said expansion of the nozzle body 9 in the direction of its longitudinal axis, the so-called nozzle elongation, influences the maximum needle stroke. The rail pressure predominating in the rail (not shown) also causes an elongation of the nozzle body and a compression of the nozzle needle.

In a needle opening process, first the piezo actuator 1 is charged by the application of current. After overcoming the idle stroke, the expansion of the piezo actuator 1 is transmitted via the pin 2 to the bell 4, wherein the pin 2 is guided in the lever housing 3. The bell 4 presses symmetrically on both sides on the lever 5 which forms a lever pair. These levers roll on the intermediate disc 6 in the manner of a rocker. The respective contact point of the two levers lies in a notch in the nozzle needle 8.

Due to the mechanism described above, the axial compression force of the piezo actuator 1 is transmitted to the nozzle needle 8. The nozzle needle is lifted from its seat as soon as the lever force is greater than the sum of the spring force and the hydraulic force, and the elasticity of the nozzle body 9 no longer ensures that the nozzle seat follows the nozzle needle.

After a defined travel, the needle stop hits the intermediate disc. A contact force is built up which acts back on the piezo actuator 1.

With such piezo actuators 1 it is possible to raise the nozzle needle 8 only partially from its seat and hold it in a so-called part stroke. The opened flow cross section between the nozzle needle and the nozzle body is here smaller than the sum of the cross sections of all nozzle bores.

FIG. 2*a*, FIG. 2*b*, FIG. 3*a*, and FIG. 3*b* show diagrams to explain the correlation between the voltage applied to the piezo actuator, the force present at the piezo actuator, the resulting needle stroke and the resulting injection rate, respectively. In this embodiment example it was assumed that a pressure of 1,000 bar predominates in the rail from which the fuel is supplied to the piezo actuator, and the piezo actuator is working in a part-stroke operation.

Figure 2A:
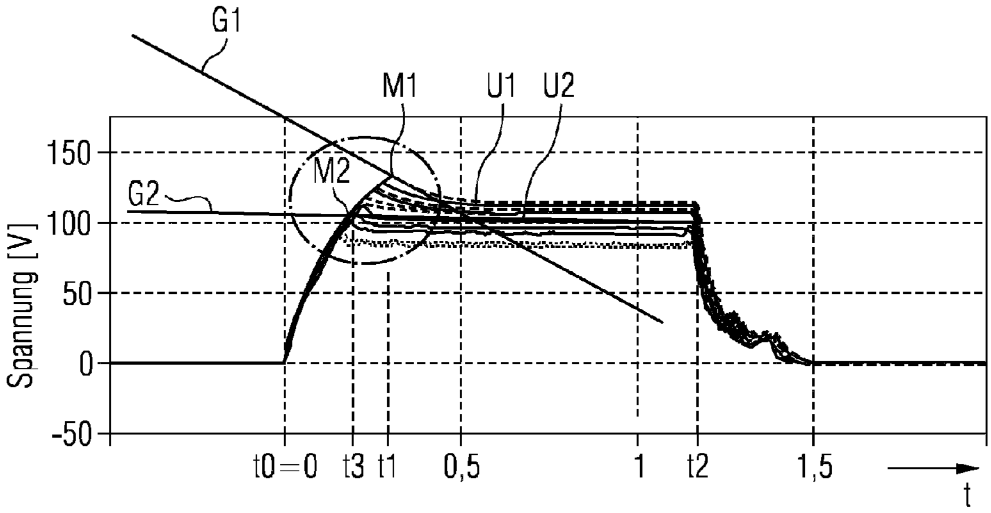
FIGS. 2*a* and 2*b* are diagrams to explain the correlation between the voltage present at the piezo actuator, and the force present at the piezo actuator, respectively.

FIG. 2*a* shows the curve of the voltage U present at the piezo injector during the part-stroke operation as a function of the time t, for several different voltages present at the piezo injector. The considerations below relate to the voltages U1 and U2 shown in FIG. 2*a*.

It is clear from FIG. 2*a* that the charging of the piezo injector begins at time t0=0. During the charging process, the voltage U1 present at the piezo actuator rises to a maximum value M1. At this time the charging process ends. After reaching the maximum M1, the voltage U1 falls again, reaches a constant voltage value and remains there until time t2. From time t2 the piezo actuator is actively discharged. Then the voltage present at the piezo actuator falls again to 0 V.

If a voltage U2 is present at the piezo actuator during the charging process, then from time t0=0 the voltage at the piezo actuator rises up to a maximum value M2 which is lower than the maximum value M1. After reaching the maximum M2, the voltage value of voltage U2 remains at the same voltage value which corresponds to the maximum value M2.

In some embodiments, the curves shown in FIG. 2*a* for the voltage present at the piezo actuator are used to draw conclusions about the force acting on the piezo actuator.

To this end, the voltage is measured after the end of the charging process i.e. when maximum value M1 or M2 is reached. A voltage gradient (see G1 and G2 in FIG. 2*a*) is then determined from the consecutive voltage values measured. Conclusions about the force acting on the nozzle needle are drawn from these voltage gradients. For this, using said voltage gradients, a previously stored database is addressed which for the given fuel pressure allocates a force value to each of a plurality of voltage gradients.

Figure 2B:
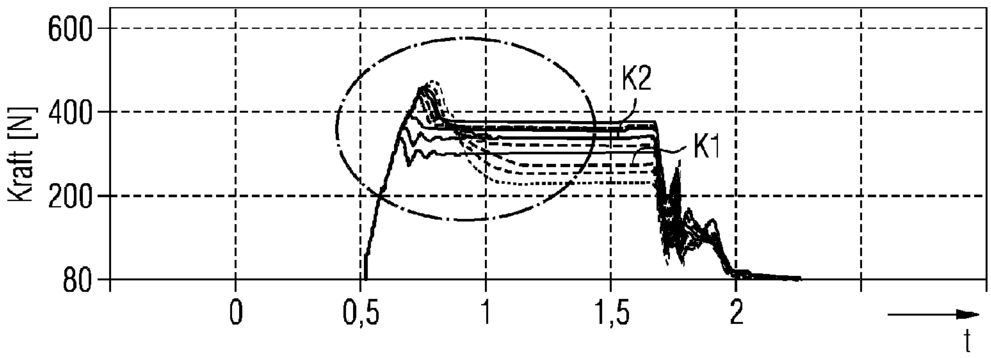

FIG. 2*b* shows the curve of the force acting on the piezo actuator during part-stroke operation over time t, again for the multiplicity of different voltages present at the piezo injector. The force curve K1 shown in FIG. 2*b* is allocated to the voltage curve U1 shown in FIG. 2*a*. The force curve K2 shown in FIG. 2*b* is allocated to the voltage curve U2 shown in FIG. 2*a*. It is evident that the force curve K1 reflects the voltage curve U1 and that the force curve K2 reflects the voltage curve U2. Thus for both U1 and also K1, after reaching the respective maximum there is clear fall in the amplitude value, so that the gradient derived from consecutive voltage or force values is comparatively great. For U2 and also K2 however, the consecutive values of voltage and force deviate from each other slightly so that the gradient has a value of around 1.

A previously stored database contains data records which, for a predefined pressure value, allocate a force value to each of a plurality of voltage gradients. By means of the voltage gradients determined, consequently this database can be addressed to determine the associated force value.

The force values determined are preferably in turn used to address a further previously stored database. This further database in turn, for a predefined rail pressure value, allocates a value for the needle stroke to each of a plurality of force values.

Figure 3A:
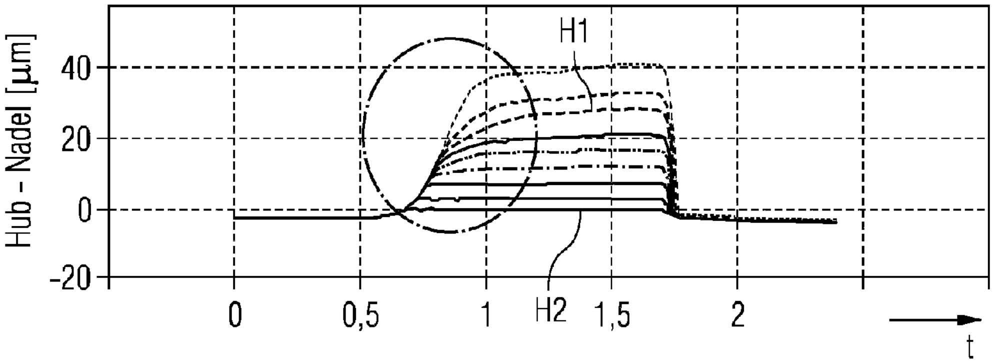
FIGS. 3*a* and 3*b* are diagrams showing the resulting needle stroke and the resulting injection rate, respectively, corresponding to the voltage and forces shown in FIGS. 2*a* and 2*b*.

This is illustrated in FIG. 3a in which the stroke of the nozzle needle is shown over time t. The curve of the stroke corresponding to force K1 is designated H1, and the curve of the stroke corresponding to force K2 is designated H2. A comparison of FIGS. 2b and 3a shows that a greater force gradient—such as in curve K1—leads to a larger stroke, while a smaller force gradient—such as in curve K2—leads to a smaller or even no needle stroke, as shown from FIG. 3a by curve H2.

Also in relation to the force-needle stroke pair, a database is provided in which, for a predefined value of the rail pressure, a stroke value is allocated to each of a plurality of force values. This database can then be addressed by means of a force value in order to determine an associated stroke value.

Figure 3B:
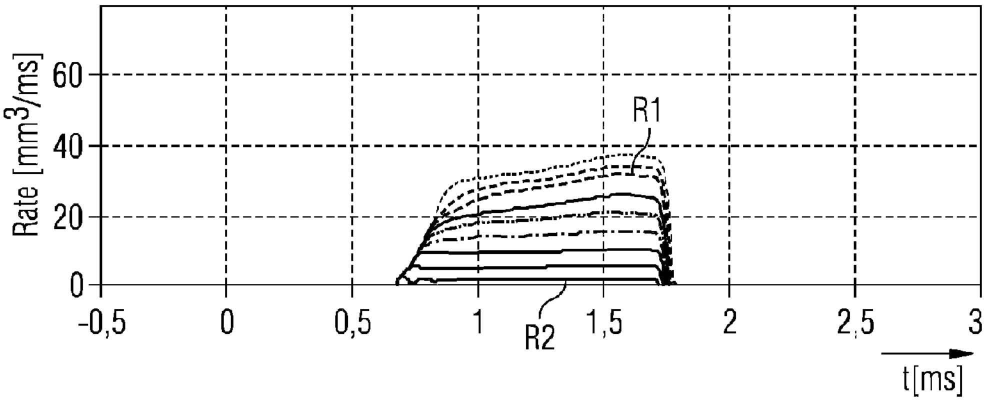

From this stroke value again conclusions can be drawn about an associated fuel flow or fuel flow rate. Thus FIG. 3b shows several fuel flow curves, one of which is designated R1 and another R2. The curve R1 is allocated to the curve H1 shown in FIG. 3a, and curve R2 to the curve H2 shown in FIG. 3a. It is evident that a larger needle stroke also leads to a greater flow rate.

This association between needle stroke and flow rate is again found in a previously stored database in which, for a predefined value of rail pressure, an associated flow rate value is stored for each of a plurality of stroke values. By means of a rail pressure value, said database can be addressed to determine an associated flow rate value.

Finally from the flow rate value, by integral formation, conclusions can be drawn about the fuel quantity injected. Using these values for the injected fuel quantity, the part-stroke operation can be regulated to ensure that the desired fuel quantity is always injected. This in turn has the advantage that said part-stroke control with its emissions benefits can be used over the entire load and rotation speed range.

It should be understood that the method steps disclosed above may be performed by a controller including a processor and computer-readable logic stored in non-transitory memory and executable by the processor for performing any of the disclosed functionality.

What is claimed is:

1. A method for determining a force acting on a nozzle needle of a directly driven piezo injector, using a charging process to build up an electrical voltage at the piezo actuator for driving the nozzle needle, taking measurements of a voltage present at the piezo actuator at the end of the charging process, determining a voltage gradient from consecutive voltage measurements, determining the force acting on the nozzle needle based on the voltage gradient, and determining a stroke of the nozzle needle based on the determined force.

2. The method of claim 1, wherein determining the force acting on the nozzle needle based on the voltage gradient comprises accessing a database in which force values are associated with each of a plurality of voltage gradients.

3. The method of claim 1, wherein determining the stroke of the nozzle needle based on the determined force comprises accessing a database in which stroke values are associated with each of a plurality of force values.

4. The method of claim 1, comprising determining a fuel flow based on the determined nozzle needle stroke.

5. The method of claim 4, wherein determining the fuel flow based on the determined nozzle needle stroke comprises accessing a database in which fuel flow values are associated with each of a plurality of stroke values.

6. The method of claim 5, comprising determining a quantity of injected fuel based on the determined fuel flow.

7. The method of claim 6, comprising determining the quantity of injected fuel by calculating an integral of the fuel flow value.

8. A controller configured to determine a force acting on a nozzle needle of a directly driven piezo injector, the controller comprising a processor and computer-readable logic stored in non-transitory memory and executable by the processor to:

perform a charging process to build up an electrical voltage at the piezo actuator for driving the nozzle needle, take measurements of a voltage present at the piezo actuator at the end of the charging process, determine a voltage gradient from consecutive voltage measurements, determine the force acting on the nozzle needle based on the voltage gradient, and determine a stroke of the nozzle needle based on the determined force.

9. The controller of claim 8, wherein determining the force acting on the nozzle needle based on the voltage gradient comprises accessing a database in which force values are associated with each of a plurality of voltage gradients.

10. The controller of claim 8, wherein determining the stroke of the nozzle needle based on the determined force comprises accessing a database in which stroke values are associated with each of a plurality of force values.

11. The controller of claim 8, wherein the logic is configured to determine a fuel flow based on the determined nozzle needle stroke.

12. The controller of claim 11, wherein determining the fuel flow based on the determined nozzle needle stroke comprises accessing a database in which fuel flow values are associated with each of a plurality of stroke values.

13. The controller of claim 12, wherein the logic is configured to determine a quantity of injected fuel based on the determined fuel flow.

14. The controller of claim 13, wherein the logic is configured to determine the quantity of injected fuel by calculating an integral of the fuel flow value.

* * * * *